Oct. 27, 1970  K. E. BECKLEY  3,536,352
EASILY ASSEMBLED AND DISASSEMBLED CAMPER
Filed March 15, 1968
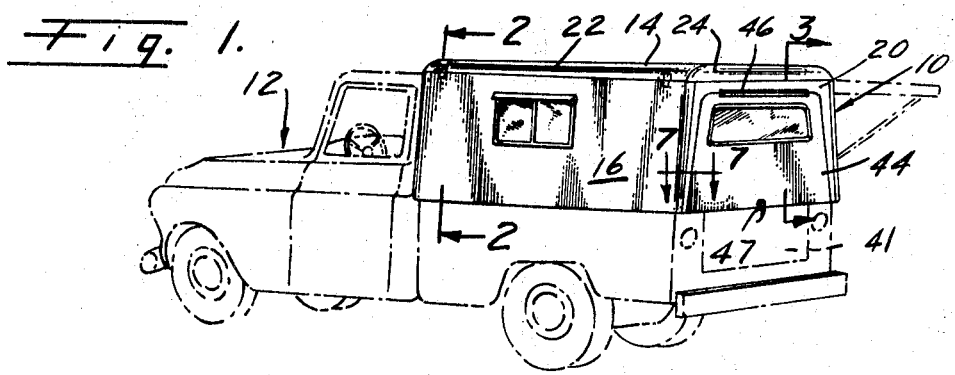
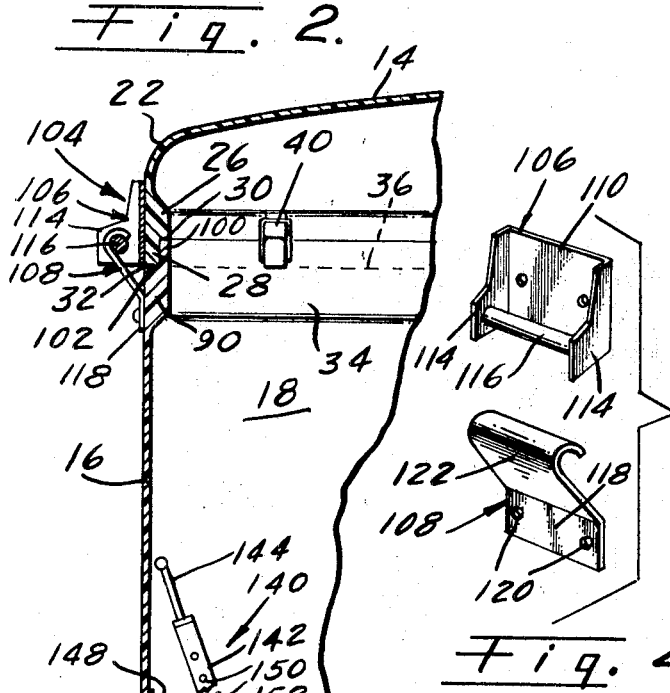
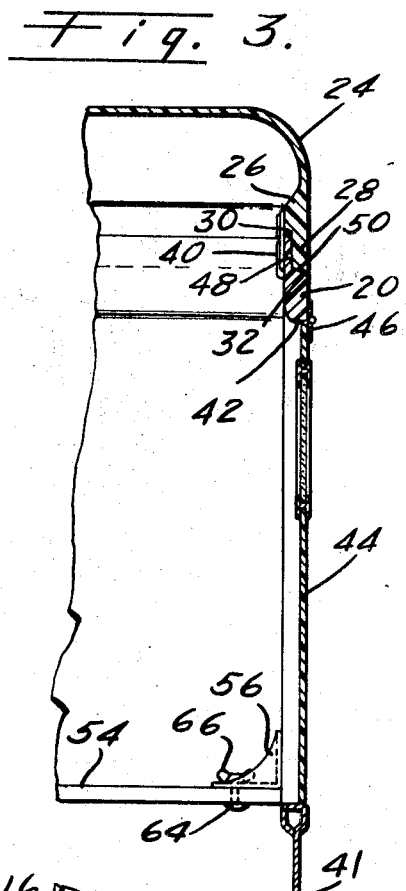
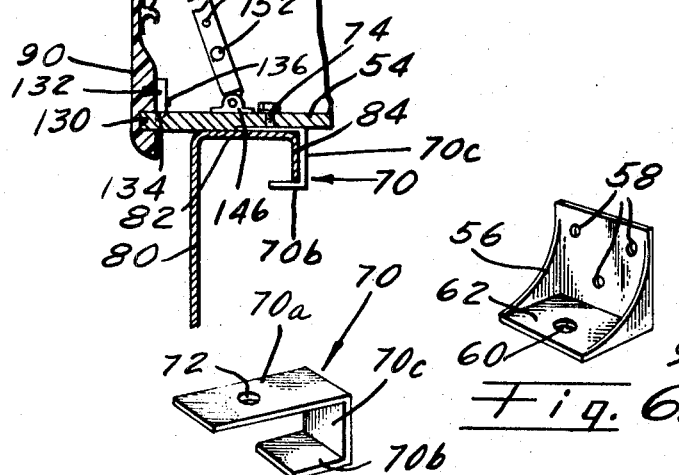
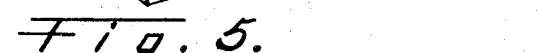
INVENTOR.
Kenneth E. Beckley
BY
J. C. Baisch
Attorney United States Patent Office 3,536,352
Patented Oct. 27, 1970

3,536,352
EASILY ASSEMBLED AND DISASSEMBLED
CAMPER
Kenneth E. Beckley, 8204 S. Broadway, Apt. A,
Whittier, Calif. 90606
Filed Mar. 15, 1968, Ser. No. 713,438
Int. Cl. B60p 3/32
U.S. Cl. 296—23                                        7 Claims

ABSTRACT OF THE DISCLOSURE

A knock-down camper body having a top, side and sections that are easily assembled and disassembled, and easily mounted on or removed from the body of a pick-up truck, trailer or the like. Section edges interlock with the edges of adjacent sections, and side sections have wrap around ends for strength and rigidity. The side sections are hinged for raising outwardly and upwardly and vice versa.

BACKGROUND OF THE INVENTION

Field of the invention.—The invention relates generally to knock-down or demountable vehicle structures and relates more particularly to sectional camper body constructions for automotive vehicles such as pick-up trucks, cargo trailers and the like.

Description of the prior art.—Sectional body structures of the knock-down sectional type that are found in current use generally take considerable time to put together or to disassemble, as well as to mount and to remove from the vehicle. Some of these require the drilling of holes in the body of the truck or other vehicle for bolts to secure the body when mounted on the vehicle. The side wall sections of such structures cannot be raised and generally the components are not adapted to nest for storage, shipping, or the like.

SUMMARY OF THE INVENTION

The present invention has particular utility embodied in a simple camper body structure that is easily and quickly assembled and disassembled and easily and quickly mounted on a vehicle, such as a pick-up truck or the like, and easily and quickly removed therefrom.

There is a top section, side wall section, and end wall sections which are adapted to be easily and quickly connected together or disconnected. When assembled the sections have interlocking or overlapping edge portions that provide weather proof joints between the sections. The side wall sections have wrap around end portions for the strength and rigidity and there are hinges for the side wall sections whereby said sections are pivoted at the top so as to swing outwardly and upwardly for ventilation and to permit ready and easy side loading and unloading. The side wall sections may also be removed so the truck can be used commercially without such side wall sections. A door may also be provided for the rear wall section.

Novelty also resides in the means for securing the camper body structure to the pick-up truck body and particularly to the top roll of the side walls of pick-up truck bodies. This top roll in modern pick-up trucks comprises an inturned portion at the top of each side wall and a downturned flange along the inner edge of the inturned portion of each side wall.

In the present invention there is a side rail for each side, said side rails extending longitudinally of the truck body and open clamps are bolted to each side rail in longitudinally spaced relation to each other. To attach the side rails the clamps are slipped over the flanges and adjacent edge portions of the top roll and the rails pushed outwardly until the closed part of the clamps engage the flanges. The end setcions of the camper body are secured to the rails by brackets and bolts and prevent the side rails from moving inwardly and disengaging the rolls of the truck body. Along the lower inner sides of the side sections are members which are spaced apart from each other, the space between said members receiving the outer longitudinal edges of the rails to provide strength and rigidity and also provides weather tight connections or joints.

OBJECTS AND ADVANTAGES OF THE INVENTION

It is an object of the invention to provide a camper body for vehicles such as pick-up trucks, cargo trailers, and the like that may be easily and quickly assembled and disassembled; and easily and quickly mounted on the vehicle and removed therefrom easily and quickly.

Another object of the invention is to provide such a camper body or body structure that is mountable on a pick-up truck or the like without the drilling of holes in the truck body.

Still another object of the invention is to provide at camper body of this character that is weather tight.

A further object of the invention is to provide a camper body of this character, the side wall sections of which are hinged for swinging outwardly and upwardly, and vice versa.

A still further object of the invention is to provide a camper body structure of this character, the sections of which may be nested compactly for storage in a small space or for shipping.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

Referring to the drawings, which are illustrative purposes only:

FIG. 1 is a perspective view of a camper body mounted on a pick-up truck, the latter being shown in phantom lines;

FIG. 2 is an enlarged sectional view taken on line 2—2 of FIG. 1;

FIG. 3 is an enlarged sectional view taken on line 3—3 of FIG. 1;

FIG. 4 is an enlarged perspective view of the hinge parts for the side sections;

FIG. 5 is an enlarged perspective view of one of the clamp members;

FIG. 6 is a perspective view of one of the brackets for securing the rails to end sections; and FIG. 7 is an enlarged sectional view taken on line 7—7 of FIG. 1.

Referring more particularly to the drawings, there is shown a camper or camper body, indicated generally at 10, mounted on the body of a pick-up truck, shown in phantom lines in FIG. 1 and indicated generally at 12.

The camper body 10 comprises a top section 14, side sections 16, a front end section 18 and a rear section 20.

Top section 14 curves downwardly at the sides, as at 22, and at the front and rear, as at 24. The lower free edge of the top section is thickened, as at 26, and has a depending flange 28, the outer side of which is flush with the exterior surface of the adjacent part of the top. There is an interior shoulder 30 spaced upwardly of the lower edge 32 of the flange, said lower edge 32 being inclined downwardly and outwardly.

The front section 18 has a thickened upper edge portion 34 with an interior flange 36 disposed at the outer side of the flange 28 of the top section at the rear of said top section so these flanges overlap and provide a weather proof joint. The front end and top sections are secured together by any suitable means. The means shown at 40 being a releasable trunk latch of well known characters, one part of which is attached to the top section, the other part being attached to the adjacent part of the front end section.

The rear section 20 rests snugly on the upper edge of the tailgate 41 of the pick-up truck body and said rear section has a door opening 42 provided with a door 44 hinged at the top by means of a hinge 46. The lower edge of the door has a snug fit with the upper edge of the tailgate 41. The door also has a window installed by any suitable well known weather proof means.

A suitable latch or lock 47 is provided for the door adjacent the bottom thereof for releasably latching and/or locking the door in the closed position. Any suitable latch or lock means of well known character may be used.

The top edge portion of the rear section is thickened and has an upwardly extending interior flange 48 at the inner side of the adjacent flange 28 of the top section, the upper end of the flange 48 extending to the shoulder 30 at the inner side of the edge portion 26 of the top section. The rear end section has a downwardly and outwardly inclined shoulder 50 corresponding to the shoulder 32 of the top section to provide a weather proof joint between the rear end and top sections. The rear end and the top sections are secured together by trunk latches 40.

The side edge portions of the rear section are also of increased thickness, best shown at 20a in FIG. 7, and there is an outwardly extending inner flange 20c along the side edges of said rear section. There is a shoulder 20b along the base of the exterior side of the flange 20a.

There are a pair of interior rails 54 which extend longitudinally of the camper body, the ends of said rails being secured to the respective front and rear sections by means of brackets 56 which have openings 58 for screws or bolts whereby the upstanding sides of the brackets are secured to the adjacent end sections. A hole 60 is provided in the horizontal part 62 of each bracket for reception of a bolt 64 disposed in a hole provided therefor in the adjacent end portion of each rail and aligned with the bracket hole 60. A wing nut 66 is provided for the bolt 64. The rails are similarly secured to the front end section.

To the under side of each rail 54 are a plurality of longitudinally spaced clamp means or clamp members 70 which are generally U-shaped and may be considered channel members having one arm, indicated at 70a, longer than the other arm indicated at 70b. Arms 70a and 70b are connected together at one end by a wall 70c. Arm 70a of each channel member has an opening or hole 72 therein for reception of a bolt or screw 74 which is also received in an opening provided therefor in each rail and in alignment with the hole 72, the bolt or screw having a nut 76 thereon. It is to be noted that the under side of the rail has a recess therein for each clamp member in which the arm 70a of said clamp member is disposed. The inner side of the arm 70a is in the same plane as the under side of the rail. There are at least two clamp means for each rail, one adjacent each end of the rail.

The clamps are adapted to be attached to the top rolls of the side walls 80 of the body of pick-up trucks and the like and said clamps open outwardly. In the pick-up truck herein disclosed each side 80 of the truck body has a top roll comprising an inturned part 82 which is horizontal, and a depending flange 84 along the inner edge of the inturned portion of each side wall. The rails, when the camper body is attached to the truck body, rest on the inturned portions 82 of the top rolls. Each rail is placed on its respective inturned portion 82 and moved outwardly so that the clamps thereof slide onto the inner portion of the inturned portion 82 and the flange 84. When in proper clamping position, the wall 70c of the clamps abut against the flange 84. Thereafter the end sections of the camper body are secured to the ends of the rails and hold said rails against displacement thereby securely attaching camper body to the truck body. Removal of the camper body from the truck is effected by reversing the above-described procedure. Obviously, no bolt holes or screw holes for bolts or screws to secure the camper body to the truck body are needed.

The side sections 16 are of the same construction so that a description of one side section will suffice.

The side section 16 is marginally thickened, as at 90, along the top, 92 along the bottom and 94 along the sides. The ends of the side section 16 are curved inwardly or what may be termed a wraparound construction which provides strength and rigidity to the camper body, this arrangement being best shown in FIGS. 1 and 7. It is to be understood that at least a portion of the thickened side parts 94 are inturned and there are flanges 96 extending toward the adjacent end sections, said flanges 96 overlapping the flanges 20a of the end sections and the free ends of said flanges 96 abutting against the shoulders 20b of the rear section. The front section has thickened end portions and flanges similar to those shown and described relative to the rear end section. The front end of the side section, being of the same construction as that shown and described in connection with the rear end section, has a corresponding joint with the front end of the side section.

The top edge portion 90 of the side section has a flange 100 that, when the side section is in the closed position, lies against the inner side of the flange 28 of the adjacent side of the top section. The free end of the flange 100 abuts against the shoulder 30 of the top section and there is a downwardly and outwardly inclined shoulder 102 at the base of the flange 100 and at the outer side thereof, said shoulder 102 abutting against the corresponding shoulder 32 of the top section.

The means securing the top of the side section comprises a hinge, indicated generally at 104. This hinge comprises two parts, which will be termed an upper hinge part, indicated generally at 106, and a lower hinge part, indicated generally at 108.

Upper hinge part 106 has a wall 110 with holes 112 therein for screws whereby said hinge part is attached to the side edge portion of the top section. There are outwardly turned ears 114 between which a pivot pin 116 is disposed, the ends of said pivot pin being secured to the respective ears 114 by welding, brazing or other suitable means.

The lower hinge part 108 has a flat base 118 having holes 120 therein for screws whereby said hinge part is attached to the upper end portion of the side section in operable alignment with the upper hinge part. From the upper edge of the base 118 there is an outwardly and upwardly inclined part 122 having an inturned part 124 forming a hook for reception of the pivot pin 116 when the side section is attached to the top section.

The lower thickened part 92 of the side is provided with a longitudinally extending groove 130 in which an outer longitudinal edge portion of the adjacent rail is received when the side section is in the closed position, as best shown in FIG. 2. Means for releasably latching the side section in the closed position is provided and any suitable well known latch means may be used. One such latch means, indicated generally at 132, is attached to the inner side of the side section and includes a spring urged bolt 134 having an inclined end portion facing inwardly so that when the side section is moved from an open position to the closed position the bolt will be moved upwardly when engaged by the outer free edge of the rail until it can slip into a recess provided therefor in the rail. The side section is thereby latched in the closed position. Latches of this character are arranged with an outwardly extending pin or knob 136 so that the bolt may be moved out of the recess in the rail to release the side section and permit it to be raised. It is preferable to have a plurality of such latches. Two, for example, may be used, one adjacent each end of the side section and rail.

When the side sections are in the closed position with the outer free edge positions of the rails disposed in the grooves 130, the camper body is very rigid and strong so that there is little or no twisting thereof when the vehicle on which it is mounted is being driven, even where the roads are rough and uneven.

The side sections may be raised to an open position whereat said sections are substantially horizontal, as shown in dotted lines in FIG. 1. They are retained in the open position by adjustable braces, indicated generally at 140, which may be of any suitable well known character now on the market. Since these devices for the respective side sections are the same, a description of one will suffice. One type of such device is shown and comprises a pair of telescoping parts 142 and 144. One of these parts, for example part 142, is pivotally mounted to a rail 54 by means of a bracket 146 secured to the rail. The other part has a releasable connection with the adjacent side section. For example, there is a member 148 having a socket into which the free end of the other telescoping part is disposed. One of the telescoping parts is provided with a suitably positioned hole while the other part has a series of longitudinally spaced holes 150 for reception of a pin 152. Thus, the two parts may be held against relative longitudinal movement when in an adjusted position.

By having the side sections arranged so that they may be opened and held in an open position, side loading or unloading is rendered easy. Also, when the side sections are open good ventillation is provided. Further, with the side sections open a canopy can be readily attached to them to provide an addition room or rooms when camping.

If desired, the side sections may be easily and quickly removed by unlatching and partly raising them. They may then be unhooked from the pivot pins of the top section. They may also be as easily and quickly attached to the hinge pins of the top section.

The camper body can be easily and quickly assembled and installed on the body of a pick-up truck and as easily and quickly removed and disassembled. When knocked down or disassembled the sections can be compactly nested to occupy a minimum of space for storage or shipping.

The door 44 at the rear and the tailgate, as well as the side sections, can be opened outwardly. A releasable brace, not shown, is used to hold the door in the open position.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned except as defined in the accompanying claims:

I claim:
1. An easily assembled and disassembled camper body for removable mounting on a vehicle, comprising:
    (A) a top section;
    (B) side wall sections;
    (C) front and rear end wall sections;
    (D) releasable latch means spaced along abutting edges of said wall sections for securing said section together to form an enclosure;
    (E) releasable interiorly mounted clamp means secured to the camper body and slidable onto fixed parts of a vehicle for securing said camper body to a vehicle, said clamp means comprise outwardly opening oppositely arranged channel members connected to the end wall sections; and
    (F) longitudinally extending horizontal rails, the respective ends of which are secured to said end wall sections, and means securing said clamp means to respective rails.

2. The invention defined by claim 1, wherein the side wall sections have longitudinally extending grooves in which outer edge portions of the rails are received when the side wall sections are in the closed position.

3. An easily assembled and disassembled camper body for removable mounting on a vehicle comprising:
    (A) a top section;
    (B) side wall sections;
    (C) front and rear end wall sections;
    (D) releasable latch means spaced along abutting edges of said wall sections for securing said sections together to form an enclosure;
    (E) releasable interiorly mounted clamp means secured to the camper body and slidable onto fixed parts of a vehicle for securing said camper body to a vehicle; and
    (F) hinge means for the side wall sections, one part of said hinge means for a side section being secured to the side edge portions of the top section, and the other part of said hinge means being secured to the top edge portion of respective side wall sections thereby providing means for pivotally swinging said side sections outwardly and upwardly, and vice versa.

4. The invention defined by claim 2, wherein the means for securing the side wall sections to the top section comprises hinges whereby the side wall sections may be swung outwardly and upwardly, and vice versa, the outer edge portions of said rails being movable into and out of said grooves in accordance with swinging movements of said side wall sections.

5. The invention defined by claim 3, wherein the hinge means parts are readily disconnectable, said hinge means parts attached to one of the sections comprising pivot pins and the hinge means parts connected to the other of said sections being hook shaped.

6. The invention defined by claim 3, including brace means for the side sections for retaining said sections in an open position.

7. The combiation of the invention defined by claim 5, with a vehicle having an open body at the rear, said body having a horizontal bed, upstanding side walls, and upstanding end walls, said side walls of the vehicle body having inturned top edge portions with flanges depending from the inner edges thereof, the lower edges of said flanges being spaced from the bed of said vehicle; the parts of the hinges connecting the side wall sections with the top section being readily disconnectable; the clamp means comprising outwardly opening channel members extending longitudinally of the body; horizontal rails extending longitudinally of the camper body and having their ends disconnectably connected to respective end wall sections; said channel members being secured to respective rails; edges of adjacent body sections overlapping, said side wall sections having longitudinally extending grooves in which edge portions of the rails are received when the side wall sections are in the lower, closed position.

References Cited

UNITED STATES PATENTS 3,186,755   6/1965   Ward ------------- 296—27 X
2,591,380   4/1952   Schreiner --------- 296—27 X
2,886,375   5/1959   Crawford --------- 296—100

PHILIP GOODMAN, Primary Examiner

U.S. Cl. X.R.

296—100